(12) United States Patent
Zhou et al.

(10) Patent No.: US 11,643,594 B2
(45) Date of Patent: May 9, 2023

(54) STABLE QUANTUM DOT COMPOSITIONS

(71) Applicant: SHPP GLOBAL TECHNOLOGIES B.V., Bergen op Zoom (NL)

(72) Inventors: Bing Zhou, Mt. Vernon, IN (US); Christopher Luke Hein, Mt. Vernon, IN (US); Hao Zhou, Mt. Vernon, IN (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 50 days.

(21) Appl. No.: 17/286,658

(22) PCT Filed: Oct. 22, 2019

(86) PCT No.: PCT/IB2019/059013
§ 371 (c)(1),
(2) Date: Apr. 19, 2021

(87) PCT Pub. No.: WO2020/084487
PCT Pub. Date: Apr. 30, 2020

(65) Prior Publication Data
US 2021/0371733 A1    Dec. 2, 2021

(30) Foreign Application Priority Data
Oct. 22, 2018   (EP) .................................... 18201729

(51) Int. Cl.
*C09K 11/02*    (2006.01)
*C09K 11/56*    (2006.01)
(Continued)

(52) U.S. Cl.
CPC .......... *C09K 11/025* (2013.01); *C08G 77/448* (2013.01); *C08J 3/22* (2013.01);
(Continued)

(58) Field of Classification Search
CPC ....... C09K 11/025; C09K 11/02; B82Y 30/00; B82Y 20/00; C08G 77/448; C08L 83/10
See application file for complete search history.

(56) References Cited

U.S. PATENT DOCUMENTS 7,192,795 B2 * 3/2007 Boardman ............... H01L 33/52
257/E33.059
7,321,193 B2 * 1/2008 Antoniadis ......... H01L 51/5036
313/506

(Continued)

FOREIGN PATENT DOCUMENTS

CN     103261283 A    8/2013
CN     108102640 A    6/2018
(Continued)

OTHER PUBLICATIONS

Extended European Search Report issued in European Application No. 18201729.3, dated May 23, 2019, 14 pages.
(Continued)

*Primary Examiner* — C Melissa Koslow
(74) *Attorney, Agent, or Firm* — Quicker Law, LLC (57) ABSTRACT

A nano-composite includes a thermoplastic copolymer includes a polycarbonate copolymer including repeating siloxane units and a plurality of quantum dots. A method of making a polymer film includes forming a masterbatch composition by combining (1) a first thermoplastic copolymer including a polycarbonate copolymer including repeating siloxane units and (2) a plurality of quantum dots; combining the masterbatch composition with a second thermoplastic polymer to form a mixture; and forming the polymer film from the mixture. The polycarbonate copolymer has a siloxane content of from 15 wt % to 65 wt %.

7 Claims, 3 Drawing Sheets

(51) Int. Cl.
*C09K 11/88* (2006.01)
*C08G 77/448* (2006.01)
*C08L 83/10* (2006.01)
*C08J 5/18* (2006.01)
*C08J 3/22* (2006.01)
*B82Y 30/00* (2011.01)
*B82Y 20/00* (2011.01)

(52) U.S. Cl.
CPC ............ *C08J 5/18* (2013.01); *C08L 83/10* (2013.01); *C09K 11/565* (2013.01); *C09K 11/883* (2013.01); *B82Y 20/00* (2013.01); *B82Y 30/00* (2013.01); *C08J 2383/10* (2013.01)

(56) References Cited

U.S. PATENT DOCUMENTS

| | | | |
|---|---|---|---|
| 7,981,667 | B2 | 7/2011 | Nie et al. |
| 8,101,680 | B1 | 1/2012 | Ramakrishan et al. |
| 9,680,072 | B2 | 6/2017 | Kurtin et al. |
| 9,701,897 | B2 | 7/2017 | Xu et al. |
| 10,035,952 | B2 | 7/2018 | Koole et al. |
| 2008/0015290 | A1 | 1/2008 | Siripurapu et al. |
| 2008/0149164 | A1 | 6/2008 | Goedmakers et al. |
| 2010/0059743 | A1 | 3/2010 | Jun et al. |
| 2010/0177496 | A1 | 7/2010 | Gillies et al. |
| 2010/0276638 | A1 | 11/2010 | Liu et al. |
| 2013/0087821 | A1* | 4/2013 | Do .................. H01L 33/507 257/98 |
| 2014/0117393 | A1* | 5/2014 | van Heerbeek .... B29D 11/0074 264/1.36 |
| 2015/0284627 | A1 | 10/2015 | Bohmer et al. |
| 2017/0082896 | A1 | 3/2017 | Jang et al. |

FOREIGN PATENT DOCUMENTS

| | | |
|---|---|---|
| EP | 3172291 A1 | 5/2017 |
| JP | H05-156170 A | 6/1993 |
| JP | 2005-514645 A | 5/2005 |
| JP | 2009-046654 A | 3/2009 |
| JP | 2012-504690 A | 2/2012 |
| JP | 2017-063197 A | 3/2017 |
| JP | 2018-150530 A | 3/2018 |
| KR | 10-2007-0030919 A | 3/2007 |
| WO | 03058292 A1 | 7/2003 |
| WO | 2008042500 A1 | 4/2008 |
| WO | 2010076680 A1 | 7/2010 |
| WO | 2012138068 A2 | 10/2012 |
| WO | 2013078309 A1 | 5/2013 |
| WO | 2015140642 A2 | 9/2015 |
| WO | 2016168048 A1 | 10/2016 |
| WO | 2016174592 A1 | 11/2016 |
| WO | 2017117162 A1 | 7/2017 |
| WO | 2017165608 A1 | 9/2017 |

OTHER PUBLICATIONS

International Search report and Written Opinion issued in International Application No. PCT/IB2019/059013, dated Dec. 6, 2019, 12 pages.
Trung N. N., et al., "Preparation and Characterization of Silicone Resin Nanocomposite containing CdSe/ZnS Quantum Dots," Polymer Composites, Oct. 2012, vol. 33(10), pp. 1785-1791. (Abstract Only).
Trung N.N., et al., "Enhanced Fluorescence, Morphological and Thermal Properties of CdSe/ZnS Quantum Dots Incorporated in Silicone Resin," Journal of Nanoscience and Nanotechnology, Jan. 2013, vol. 13, No. 1, pp. 434-442. (Abstract Only).

* cited by examiner

STABLE QUANTUM DOT COMPOSITIONS

CROSS-REFERENCE TO RELATED APPLICATION

This application is the National Stage of International Application No. PCT/IB2019/059013 filed Oct. 22, 2019, which claims priority to and the benefit of European Application No. 18201729.3 filed Oct. 22, 2018, the disclosures of which are incorporated herein by this reference in their entireties.

FIELD OF THE DISCLOSURE

The present disclosure relates to compositions including quantum dots, and in particular to nano-composites including a thermoplastic polymer and quantum dots; the thermoplastic polymer includes a polycarbonate copolymer including repeating siloxane units.

BACKGROUND OF THE DISCLOSURE

Semiconducting quantum dots (QD) exhibit unique optical properties and are highly emissive upon UV to blue light excitation. QD composite films, in which QDs are dispersed in polymer matrix, have been commercialized for display applications as a component of a backlight unit. In either form of pellet or film, dispersion of QDs in the polymer matrix and thermal stability of QDs are properties that affect light conversion efficiency, longevity and cost of QD composites. Significant efforts from academia and industries have been made to improve these two aspects. While encapsulation, functionalization of QDs and deployment of dispersion medium (e.g., carrier polymers) can improve dispersion and thermal stability of QDs to certain extent, it remains a challenging task to improve thermal stability while maintaining high fluorescence quantum yield.

Another challenge to manufacture a high quality QD composite relates to the design or selection of matrix material. First, under typical high temperature extrusion conditions, many polymer materials (e.g., polycarbonate) can go through complex chemical reactions when exposed to a surface layer of semiconducting QDs and catalyzed by the surface chemistry (e.g., acid/base), leading to degradation of the polymer and a loss of mechanical strength, optical clarity, and melt strength. Second, dispersion mediums (e.g., acrylic polymers) can be custom made to reduce the agglomeration of QDs due to its good compatibility with QDs. In addition to the added and usually high cost, the dispersion medium imposes another selection criterion on the polymer matrix as these two materials need to be compatible with each other, otherwise the optical transparency and optimum dispersion of QD composite are compromised.

Quantum Dot Enhancement Films (QDEF) have been commercialized by Nanosys and Samsung for display applications. In QDEF, quantum dots are embedded in a film within a polymer matrix. Both upper and lower sides of formed the QD film layer are capped with barrier films to prevent the permeation of oxygen and moisture to the QDs. Barrier films consist of multiple layers of semi-crystalline polymer and metal oxide, applied via a multi-step lamination process. The cost of the barrier films is roughly ⅓ of the total film cost and the inclusion of the barrier films doubles or triples the thickness of the QD layer in the final structure. The added thickness make it less desirable for mobile device applications. Another issue is edge ingress where oxygen and water permeate into the quantum dot layer and degrade the QD over time since the four edges of film are not protected by barrier layers. Stable quantum dots or QDs film formulation to reduce the reliance on barrier films are highly desired.

Another requirement for the manufacture of high quality QD film is for the QDs to be optimally dispersed in the polymer matrix. QDs are traditionally synthesized in a colloidal solution. As prepared, QDs are well-dispersed in the colloidal solution and well-separated from each other. However, QDs are substantially more densely packed when used in QD films. The QDs have very high surface area to volume ratio due to the size nature of nanomaterials, and have the tendency to aggregate if conditions allow. The shortened inter-particle distance and the medium of the polymer matrix causes complex excitonic properties of QDs. The fluorescence of QDs exhibits a minor to obvious red shift and reduced quantum yield compared to the solution. Both phenomena are caused by a confluence of multiple factors including the dielectric properties of the polymer medium, the Forster resonance energy transfer (FRET) from smaller to larger QDs due to the size distribution within the ensemble of them and the increased likelihood of more trapping of excitons in the defects of QDs. The red shifts and lower quantum yield can cause a significantly negative impact on the color outputs, light conversion efficiency and cost of the QD composite. The high polarity and the associated high dielectric properties may exclude certain polymers (e.g., polycarbonate) as a viable matrix material for a QD display.

Current approaches to improve stability of QDs include varying the composition of QDs and adding encapsulation/passivation coatings/layers to the QDs. Approaches to improve QD dispersion include functionalizing the QDs or introducing a dispersion medium (e.g., a carrier polymer) to retain the dispersion of QDs during the film formation process.

As an example, Crystalplex Corporation has developed and commercialized quantum dots with gradient alloys in which the composition of the QD varies from the core to the surface of QDs. In addition, the surface of the QD is capped by a high band gap energy material (ZnS) to improve quantum yield and includes an adjacent external layer of $Al_2O_3$ for enhanced stability against heat or photons. This approach provides good thermal and photostability to the QD and reduces the need for a barrier film.

The exterior layer of the QD has also been functionalized with alkyl groups to allow them to be soluble or stably suspended in common organic solvents. Liquid-Ion Solutions has developed an acrylic polymer having good surface compatibility with alumina-coated gradient quantum dots that allows the QDs to maintain spatial separation in the polymer matrix. In this way, high quantum yield of QDs is largely retained and peak emission wavelength does not drastically change compared to the solution phase. However, this approach may limit the selection of the matrix polymer based on the compatibility of carrier and matrix polymers. The polymers that are compatible with the acrylic material may not be sufficient for structural integrity, thus the dimensional stability may remain a concern after expedited hydroaging testing. In addition, due to the relatively high viscosity of the acrylic material, QDs may have some level of agglomeration even when used with the acrylic material. The agglomerated QDs not only increase the cost of QD pellets or films but also lower the quantum yield or reduce conversion efficiency. Without a carrier polymer, the polar nature of certain type of polymers may interfere with excitonic properties and quench the fluorescence of the QD.

These and other shortcomings are addressed by aspects of the disclosure.

SUMMARY

Aspects of the disclosure relate to a nano-composite including: a thermoplastic copolymer including a polycarbonate copolymer including repeating siloxane units; and a plurality of quantum dots.

Aspects of the disclosure further relate to a nano-composite including from 98 to 99.99 wt % of the thermoplastic copolymer including the polycarbonate copolymer including repeating siloxane units; and from 0.01 wt % to 2 wt % of the plurality of quantum dots.

Yet further aspects of the disclosure relate to a method of making a polymer film, including: forming a masterbatch composition by combining (1) a first thermoplastic copolymer including a polycarbonate copolymer including repeating siloxane units and (2) a plurality of quantum dots; combining the masterbatch composition with a second thermoplastic polymer to form a mixture; and forming the polymer film from the mixture. The polycarbonate copolymer has a siloxane content of from 15 wt % to 65 wt %.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In aspects of the disclosure, siloxane, such as silicone homopolymers and copolymers, is used as part of the building block of the nano-composite. For example, a range of poly(carbonate-siloxane) block copolymers were explored for this purpose including those having high siloxane content (e.g., 10-65 wt % siloxane units).

In aspects of the disclosure the siloxane domains of poly(carbonate-siloxane) block copolymers may function as a compatible region for preferential nano-materials such as quantum dots (QDs). Quantum dots may reside within or around siloxane domains so as to allow the QDs to retain good quantum yield and emissive color in a part or film. The QDs have improved mechanical properties as compared to acrylic-based compositions. These two approaches can be used together.

The nano-composites described herein may be useful in film structures, injection molded articles, compression molded articles, 3D-printed articles, and laser sintered articles. Specific exemplary applications include LCD displays having solid state energy sources such as LEDs, UV sources, automotive forward lighting, and remote phosphor systems for lighting devices, security devices and authentication processes.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "polycarbonate copolymer" includes mixtures of two or more polycarbonate copolymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Nano-Composite Including Siloxane Copolymer

Aspects of the disclosure relate to a nano-composite including a polycarbonate copolymer including repeating siloxane units and a plurality of quantum dots.

The plurality of quantum dots are dispersed in the thermoplastic copolymer. In certain aspects the plurality of quantum dots are not covalently bound to the thermoplastic copolymer.

Figure 2:
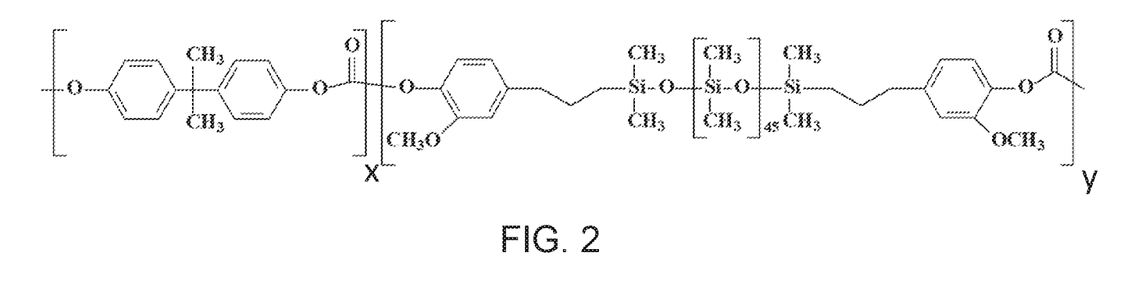
FIG. 2 illustrates a copolymer building block for an exemplary poly(carbonate-siloxane) copolymer in accordance with aspects of the disclosure.

An example building block for the polycarbonate copolymer including repeating siloxane units is shown in FIG. 2.

The polycarbonate copolymer including repeating siloxane units may be referred to herein as a poly(carbonate-siloxane) copolymer, and includes carbonate units and siloxane units. Suitable carbonate units are shown in formula (1)

wherein at least 60 percent of the total number of $R^1$ groups is aromatic, or each $R^1$ contains at least one $C_{6-30}$ aromatic group. A combination of different W groups can be present. The carbonate units can be derived from a dihydroxy compound such as an aromatic dihydroxy compound of formula (2) or a bisphenol of formula (3)

wherein in formula (2), each $R^h$ is independently a halogen atom, for example bromine, a $C_{1-10}$ group such as a $C_{1-10}$ alkyl, a halogen-substituted $C_{1-10}$ alkyl, a $C_{6-10}$ aryl, or a halogen-substituted $C_{6-10}$ aryl, and n is 0 to 4; and in formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen.

In an aspect in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In still other aspects in formula (2), p and q is each 0, or p and q is each 1, and $R^a$ and $R^b$ are each a $C_{1-3}$ alkyl group, preferably methyl, disposed meta to the hydroxy group on each arylene group; $X^a$ is a bridging group connecting the two hydroxy-substituted aromatic groups, where the bridging group and the hydroxy substituent of each $C_6$ arylene group are disposed para to each other on the $C_6$ arylene group, and $X^a$ can be a substituted or unsubstituted $C_{3-18}$ cycloalkylidene; a $C_{1-25}$ alkylidene of the formula —C($R^e$)($R^d$)— wherein $R^e$ and $R^d$ are each independently hydrogen, $C_{1-12}$ alkyl, $C_{1-12}$ cycloalkyl, $C_{7-12}$ arylalkylene, $C_{1-12}$ heteroalkyl, or cyclic $C_{7-12}$ heteroarylalkylene; or a group of the formula —C(=$R^e$)— wherein $R^e$ is a divalent $C_{1-12}$ hydrocarbon group.

Examples of diphenols (2) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination including different diphenol compounds can be used.

Examples of bisphenols (3) include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 2,7-dihydroxycarbazole, or the like. A combination including different bisphenol compounds can be used.

Specific dihydroxy compounds include resorcinol, 2,2-bis (4-hydroxyphenyl) propane (bisphenol A or BPA), 3,3-bis (4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, and 1,1-bis(4-hydroxyphenyl)-3,3,5-trimethylcyclohexane (TMC bisphenol).

In an aspect of formula (2), $R^a$ and $R^b$ are each independently $C_{1-6}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In more preferred aspect, the bisphenol polycarbonate is a bisphenol A polycarbonate homopolymer, also referred to as bisphenol A homopolycarbonate, which has repeating structural carbonate units of formula (1a).

Such linear homopolymers containing bisphenol A carbonate units (BPA-PC) include those commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC.

The siloxane units (also referred to as polysiloxane blocks) are optionally of formula (4)

(4)

wherein each R is independently a $C_{1-13}$ monovalent organic group. For example, R can be a $C_{1-13}$ alkyl, C-$C_{13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with one or more of fluorine, chlorine, bromine, or iodine. In an aspect, where a transparent poly(carbonate-siloxane) is desired, R is unsubstituted by halogen. A combination of the foregoing R groups can be used in the same poly(carbonate-siloxane).

In an aspect, each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another aspect, each R is independently methyl, trifluoromethyl, or phenyl.

(5)

wherein E is as defined for formula (4); each R can be the same or different, and is as defined for formula (4); and Ar can be the same or different, and is a substituted or unsubstituted $C_6$-$C_{30}$ arylene, wherein the bonds are directly connected to an aromatic moiety. Ar groups in formula (5) can be derived from a $C_6$-$C_{30}$ dihydroxyarylene compound, for example a dihydroxy compound of formula (2) or formula (3). Exemplary dihydroxy compounds are 1,1-bis(4-hydroxyphenyl) methane, 1,1-bis(4-hydroxyphenyl) ethane, 2,2-bis (4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (5) include those of the formulas (6a) and (6b)

(6a)

(6b)

The value of E in formula (4) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In an aspect, E has an average value of 10 to 80 or 10 to 40, and in still another aspect, E has an average value of 40 to 80, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used. A combination of a first and a second (or more) poly(carbonate-siloxane)s can be used, wherein the average value of E of the first copolymer is less than the average value of E of the second copolymer.

Suitable siloxane units have been described, for example, in WO 2008/042500 A1, WO 2010/076680 A1, and WO 2016/174592 A1. In an aspect, the siloxane units are of formula (5)

wherein E is as described in Formula (4). In an aspect, E has an average value of 10 to 80 or 10 to 40, and in still another aspect, E has an average value of 40 to 80, or 40 to 70.

In another aspect, the siloxane units are of formula (7)

(7)

wherein R and E are as described for formula (4), and each $R^5$ is independently a divalent $C_{1-30}$ hydrocarbylene group, and wherein the polymerized polysiloxane unit is the reaction residue of its corresponding dihydroxy compound. In a specific aspect, the polydiorganosiloxane blocks are of formula (8):

(8)

wherein R and E are as defined for formula (5). $R^6$ in formula (8) is a divalent $C_{2-8}$ aliphatic group. Each M in formula (8) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkylenoxy, $C_{7-12}$ alkylarylene, or $C_{7-12}$ alkylarylenoxy, wherein each n is independently 0, 1, 2, 3, or 4.

In an aspect in formula (8), M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl.

In another aspect in formula (8), R is methyl, or a combination of methyl and trifluoropropyl, or a combination of methyl and phenyl. In still another aspect in formula (8), R is methyl, M is methoxy, n is one, and $R^6$ is a divalent $C_{1-3}$ aliphatic group. Preferred polydiorganosiloxane blocks are of the formulas

(8a)

(8b)

(8c)

or a combination thereof, wherein E has an average value of 10 to 100, preferably 20 to 60, more preferably 30 to 50, or 40 to 50.

In an aspect, the poly(carbonate-siloxane) includes carbonate units derived from bisphenol A, and repeating siloxane units (8a), (8b), (8c), or a combination thereof (preferably of formula 7a), wherein E has an average value of E has an average value of 10 to 100, or 20 to 60, or 30 to 60, or 40 to 60. In an aspect, the poly(carbonate-siloxane)s include carbonate units derived from bisphenol A and repeating siloxane units of formula (8a) (8b), or (8c), wherein E has an average value of 10 to 100, or 20 to 60, or 30 to 50, or 40 to 50.

The thermoplastic copolymer, and in more specific aspects the polycarbonate copolymer including repeating siloxane units, includes from 10 wt % to 65 wt % siloxane units in some aspects, or in particular aspects from 15 wt % to 65 wt % siloxane units, or from 30 wt % to 65 wt % siloxane units, or from 30 wt % to 50 wt % siloxane units, or from 35 wt % to 45 wt % siloxane units, or 40 wt % siloxane units. The wt % siloxane units referred to herein is in reference to the total weight of the thermoplastic copolymer. The thermoplastic copolymer (polycarbonate copolymer) can have a weight average molecular weight of 26,000 to 45,000 Da, or 30,000 to 43,000 Da, or 35,000 to 40,000 Da as measured by gel permeation chromatography using a crosslinked styrene-divinyl benzene column, at a sample concentration of 1 milligram per milliliter, and as calibrated with bisphenol A polycarbonate standards. In other aspects, the polycarbonate copolymer can have a weight average molecular weight of 10,000 to 100,000 Da, or 50,000 to 100,000 Da.

In some aspects none of the thermoplastic polymer or the plurality of quantum dots include reactive functional groups. In further aspects the thermoplastic polymer and the plurality of quantum dots are not covalently bound to each other.

Any desirable quantum dots may be used in the nanocomposite. In some aspects the plurality of quantum dots are concentration-gradient quantum dots. The plurality of quantum dots include a passivation layer in certain aspects. In further aspects the plurality of quantum dots include surface ligands.

More specifically, in some aspects one or more of the plurality of quantum dots is a metal nanomaterial or an inorganic nanomaterial. The form of the plurality of quantum dots may include in certain aspects a nanoparticle, a nanofiber, a nanorod, or a nanowire.

Exemplary quantum dots according to aspects of the disclosure may include, but are not limited to, semiconductor nanocrystals selected from the group consisting of, but not limited to, Group II-VI semiconductor compounds, Group II-V semiconductor compounds, Group III-VI semiconductor compounds, Group III-V semiconductor compounds, Group IV-VI semiconductor compounds, Group compounds, Group II-IV-VI compounds, Group II-IV-V compounds, alloys thereof and combinations thereof.

Exemplary Group II elements include Zn, Cd, Hg or a combination thereof

Exemplary Group III elements include Al, Ga, In, Ti or a combination thereof

Exemplary Group IV elements include Si, Ge, Sn, Pb or a combination thereof.

Exemplary Group V elements include P, As, Sb, Bi or a combination thereof.

Exemplary Group VI elements include O, S, Se, Te or a combination thereof

Exemplary Group II-VI semiconductor compounds include binary compounds, e.g., CdSe, CdS, CdTe, ZnS, ZnSe, ZnTe, ZnO, HgS, HgSe and HgTe; ternary compounds, e.g., CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgZnSe; and quaternary compounds, e.g., CdZnSeS, CdZnSeTe, CdZnSTe, CdHgSeS, CdHgSeTe, CdHgSTe, HgZnSeS, HgZnSeTe and HgZnSTe.

Exemplary Group III-V semiconductor compounds include binary compounds, e.g., GaN, GaP, GaAs, GaSb, AlN, AlP, AlAs, AlSb, InN, InP, InAs and InSb; ternary compounds, e.g., GaNP, GaNAs, GaNSb, GaPAs, GaPSb, AlNP, AlNAs, AlNSb, AlPAs, AlPSb, InNP, InNAs, InN Sb, InPAs, InPSb, GaAlNP, AlGaN, AlGaP, AlGaAs, AlGaSb, InGaN, InGaP, InGaAs, InGaSb, AlInN, AlInP, AlInAs and AlInSb; and quaternary compounds, e.g., GaAlNAs, GaAl-NSb, GaAlPAs, GaAlPSb, GaInNP, GaIn, NAs, GaInNSb, GaInPAs, GaInPSb, InAlNP, InAlNAs, InAlNSb, InAlPAs and InAlPSb.

Exemplary Group IV-VI semiconductor compounds include binary compounds, e.g., SnS, SnSe, SnTe, PbS, PbSe and PbTe; ternary compounds, e.g., SnSeS, SnSeTe, SnSTe, PbSeS, PbSeTe, PbSTe, SnPbS, SnPbSe and SnPbTe; and quaternary compounds, e.g., SnPbSSe, SnPbSeTe and SnPbSTe.

Exemplary Group IV semiconductor compounds include unary compounds, e.g., Si and Ge; and binary compounds, e.g., SiC and SiGe.

When used, a concentration-gradient quantum dot includes an alloy of at least two semiconductors. The concentration (molar ratio) of the first semiconductor gradually increases from the core of the quantum dot to the outer surface of the quantum dot, and the concentration (molar ratio) of the second semiconductor gradually decreases from the core of the quantum dot to the outer surface of the quantum dot. Exemplary concentration-gradient quantum dots are described in, e.g., U.S. Pat. No. 7,981,667, the disclosure of which is incorporated herein by this reference in its entirety.

In one aspect, the concentration-gradient quantum dot includes two semiconductors, a first semiconductor having the formula $$Cd_xZn_{1-x}S_ySe_{1-y}$$

and a maximum molar ratio at the core of the stabilized quantum dot that gradually decreases to a minimum molar ratio at the outer surface of the quantum dot and a second semiconductor having the formula $$Zn_zSe_{1-z}S_wSe_{1-w}$$

and a maximum molar ratio at the outer surface of the stabilized quantum dot that gradually decreases to a minimum molar ratio at the core of the stabilized quantum dot.

In another aspect, the concentration-gradient quantum dot includes two semiconductors, a first semiconductor having the formula $$CdZn_xS_{1-x}$$

and a maximum molar ratio at the core of the stabilized quantum dot that gradually decreases to a minimum molar ratio at the outer surface of the quantum dot and a second semiconductor having the formula $$Z_nCd_zS_{1-z}$$

and a maximum molar ratio at the outer surface of the stabilized quantum dot that gradually decreases to a minimum molar ratio at the core of the stabilized quantum dot.

Where the plurality of quantum dots are described herein as having a shell or a multi-shell structure (i.e., a core and at least one shell), the core and the shell or plurality of shells may independently be formed of the semiconductor materials described above. Examples of semiconductor shells include, but are not limited to, CdS, CdSe, CdTe, PbS, PbSe, PbTe, ZnS, ZnSe, ZnTe, CdZnS, CdZnSe, CdZnTe, CdZnTeSe, CdZnSSe, GaAs, GaP, GaN, InP, InAs, GaAlAs, GaAlP, GaAlN, GaInN, GaAlAsP, or GaAlInN.

If included, the passivation layer may include, but is not limited to, a metal oxide (e.g., $Al_2O_3$, MgO, ZnO, etc.). The metal oxide may be in the form as a shell material surrounding the quantum dot. The passivation layer may function to shield the quantum dot from harsh outer environmental conditions during the manufacturing process or during operation, and may help the quantum dot maintain its optical properties.

In certain aspects the plurality of quantum dots include surface ligands. The surface ligands may include any ligand type that will interact (e.g., attach) to the quantum dot. Exemplary surface ligands include, but are not limited to, hydrophobic ligands such as trioctylphosphine/trioctylphosphine oxide (TOP/TOPO), long-chain alkyls, alkylamines, and alkylthiols etc. or hydrophilic ligands, such as thiolate alcohols, thiolate acids etc. or other types of tether functionalities or biofunctionalities for targeted applications. The surface ligands protect the quantum dot from damage.

The plurality of quantum dots may have a size of from 1 nanometer (nm) to 100 nm in some aspects. In particular aspects the plurality of quantum dots have a size of from 1 nm to 50 nm, or from 1 nm to 30 nm.

In some aspects the nano-composite further includes an additional thermoplastic polymer. The additional thermoplastic polymer may include, but is not limited to, polycarbonate (PC), polycarbonate-siloxane copolymer, polysiloxane, cyclic olefin copolymer (COC), polyetherimide (PEI), poly(phenylene oxide) (PPO), polyethylene terephthalate (PET), polymethyl methacrylate (PMMA), polyaryletherketone (PAEK), polyimide, polyolefin, polystyrene, copolymers thereof, or a combination thereof. The additional thermoplastic polymer may be derived from recycled materials (e.g., recycled PET). The additional thermoplastic polymer may be the same or different polymer than the polycarbonate copolymer including repeating siloxane units described herein, and may include a polycarbonate copolymer including repeating siloxane units having a different siloxane content, molecular weight and/or chain microstructure.

In a particular aspect the nano-composite includes an additional thermoplastic polymer selected from PMMA, copolymers thereof, polycarbonate-siloxane copolymer, COC, or a combination thereof.

The plurality of quantum dots include in some aspects from 0.001 wt % to 5 wt % of the nano-composite; in particular aspects the plurality of quantum dots include 0.4 wt % of the nano-composite.

In some aspects the nano-composite includes from 90 wt % to 99.9 wt % of the thermoplastic copolymer and from 0.1 wt % to 10 wt % of the plurality of quantum dots. In further aspects the nano-composite includes from 95 wt % to 99.8 wt % of the thermoplastic copolymer and from 0.2 wt % to 5 wt % of the plurality of quantum dots. In a particular aspect the nano-composite includes from 98 to 99.99 wt % of the thermoplastic copolymer, and from 0.01 wt % to 2 wt % of the plurality of quantum dots.

The nano-composite may in some aspects have an emission spectra with a maximum emission peak that shifts less than 0.5 nanometers (nm) as compared to the maximum emission peak of a colloidal solution that includes the plurality of quantum dots. The nano-composite according to aspects of the disclosure thus maintains good quantum yield as compared to the quantum dots in solution.

The thermoplastic matrix may be transparent in certain aspects. As used herein, "transparent" means that the thermoplastic polymer matrix has a transmittance of at least 80%, or at least 85%, or at least 90%, when measured in accordance with ASTM D1003 at a thickness of 3.2 millimeter (mm). In some aspects transmission is determined in accordance with ASTM D1003-00, Procedure A, using a Gardner-Haze plus instrument and a D65 illuminant.

In some aspects the nano-composite is in a form of a masterbatch composition. As known to those skilled in the art, a masterbatch composition is a concentrated mixture of additives and/or pigments encapsulated into a carrier resin using a heat process (e.g. extrusion molding) which is then cooled and cut into a granular shape. The masterbatch composition may then be blended with natural resin in a specified ratio, known as the let-down ratio (LDR), to impart desired properties to the final diluted resin. For example, an LDR of 3% refers to 97% polymer and 3% masterbatch.

Methods of Making a Polymer Film

Aspects of the disclosure further relate to a method of making a polymer film, including: forming a masterbatch composition by combining (1) a first thermoplastic copolymer including a polycarbonate copolymer including repeating siloxane units and (2) a plurality of quantum dots; combining the masterbatch composition with a second thermoplastic polymer to form a mixture; and forming the polymer film from the mixture. The polycarbonate copolymer has a siloxane content of from 15 wt % to 65 wt %.

In some aspects the masterbatch composition includes from 90 wt % to 99.9 wt % of the first thermoplastic copolymer and from 0.1 wt % to 10 wt % of the plurality of quantum dots.

The polycarbonate copolymer including repeating siloxane units and the plurality of quantum dots may have the composition and content described herein. For example, in some aspects the plurality of quantum dots are concentration-gradient quantum dots, include a passivation layer, or include surface ligands.

In one aspect the masterbatch composition includes 93 wt % to 97 wt % of the first thermoplastic copolymer and 3 wt % to 7 wt % of the plurality of quantum dots.

The second thermoplastic polymer may include, but is not limited to, polycarbonate (PC), polycarbonate-siloxane copolymer, polysiloxane, cyclic olefin copolymer (COC), polyetherimide (PEI), poly(phenylene oxide) (PPO), polyethylene terephthalate (PET), polymethyl methacrylate (PMMA), polyaryletherketone (PAEK), polyimide, polyolefin, polystyrene, copolymers thereof, or a combination thereof. The second thermoplastic polymer may be derived from recycled materials (e.g., recycled PET). The second thermoplastic polymer may be the same or different polymer than the polycarbonate copolymer including repeating siloxane units described herein, and may include a polycarbonate copolymer including repeating siloxane units having a different siloxane content, molecular weight and/or chain microstructure.

In some aspects the polymer film formed according to the method includes: from 0.5 wt % to 10 wt % of the polycarbonate copolymer including repeating siloxane units; from 0.01 wt % to 2 wt % of the plurality of quantum dots; and from 89 wt % to 99.49 wt % of the second thermoplastic polymer. In a particular aspect the polymer film includes from 0.05 wt % to 0.5 wt % of the plurality of quantum dots.

The step of forming the polymer film from the mixture may include, but is not limited to, one or more of extruding, injection molding, compression molding, transfer molding, thermoforming or additive manufacturing of the polymer film.

Articles Including the Nano-Composite

The nano-composite according to aspects described herein may be incorporated into an article, such as but not limited to a film. In particular aspects, the nano-composite may be incorporated into film structures, injection molded articles, compression molded articles, 3D-printed articles, and laser sintered articles. Specific exemplary applications for the articles formed herein include LCD displays having solid state energy sources such as LEDs, UV sources, automotive forward lighting, and remote phosphor systems for lighting devices, security devices and authentication processes.

Various combinations of elements of this disclosure are encompassed by this disclosure, e.g., combinations of elements from dependent claims that depend upon the same independent claim.

ASPECTS OF THE DISCLOSURE

In various aspects, the present disclosure pertains to and includes at least the following aspects.

Aspect 1. A nano-composite comprising:
a thermoplastic copolymer comprising a polycarbonate copolymer comprising repeating siloxane units; and
a plurality of quantum dots.

Aspect 2. The nano-composite according to Aspect 1, wherein the plurality of quantum dots are dispersed in the thermoplastic copolymer.

Aspect 3. The nano-composite according to Aspect 1 or 2, wherein the thermoplastic copolymer comprises from 10 wt % to 65 wt % siloxane units.

Aspect 4. The nano-composite according to any of Aspects 1 to 3, wherein the plurality of quantum dots comprise:
concentration-gradient quantum dots;
a passivation layer; or
surface ligands.

Aspect 5. The nano-composite according to any of Aspects 1 to 4, wherein the nano-composite further comprises an additional thermoplastic polymer.

Aspect 6. The nano-composite according to any of Aspects 1 to 5, wherein the plurality of quantum dots comprise from 0.001 wt % to 5 wt % of the nano-composite.

Aspect 7. The nano-composite according to any of Aspects 1 to 5, wherein the nano-composite comprises:
from 98 to 99.99 wt % of the thermoplastic copolymer; and
from 0.01 wt % to 2 wt % of the plurality of quantum dots.

Aspect 8. The nano-composite according to any of Aspects 1 to 5, wherein the nano-composite comprises:
from 90 wt % to 99.9 wt % of the thermoplastic copolymer, wherein the polycarbonate copolymer has a siloxane content of from 15 wt % to 65 wt %; and
from 0.1 wt % to 10 wt % of the plurality of quantum dots.

Aspect 9. The nano-composite according to Aspect 8, wherein the nano-composite comprises:
from 95 wt % to 99.8 wt % of the thermoplastic copolymer; and
from 0.2 wt % to 5 wt % of the plurality of quantum dots.

Aspect 10. The nano-composite according to Aspects 8 or 9, wherein the polycarbonate copolymer has a siloxane content of from 30 wt % to 65 wt %.

Aspect 11. The nano-composite according to Aspect 10, wherein the polycarbonate copolymer has a siloxane content of from 35 wt % to 45 wt %.

Aspect 12. The nano-composite according to any of Aspects 1 to 11, wherein the nano-composite is in a form of a masterbatch composition.

Aspect 13. A method of making a polymer film, comprising:
forming a masterbatch composition by combining (1) a first thermoplastic copolymer comprising a polycarbonate copolymer comprising repeating siloxane units and (2) a plurality of quantum dots;

combining the masterbatch composition with a second thermoplastic polymer to form a mixture; and forming the polymer film from the mixture, wherein the polycarbonate copolymer has a siloxane content of from 15 wt % to 65 wt %.

Aspect 14. The method of Aspect 13, wherein the masterbatch composition comprises from 90 wt % to 99.9 wt % of the first thermoplastic copolymer and from 0.1 wt % to 10 wt % of the plurality of quantum dots.

Aspect 15. The method of Aspect 13 or 14, wherein:

the plurality of quantum dots are concentration-gradient quantum dots;

the plurality of quantum dots comprise a passivation layer; or the plurality of quantum dots comprise surface ligands.

Aspect 16. The method of any of Aspects 13 to 15, wherein the masterbatch composition comprises 93 wt % to 97 wt % of the first thermoplastic copolymer and 3 wt % to 7 wt % of the plurality of quantum dots.

Aspect 17. The method of any of Aspects 13 to 16, wherein the polycarbonate copolymer has a siloxane content of from 30 wt % to 65 wt %.

Aspect 18. The method of Aspect 17, wherein the polycarbonate copolymer has a siloxane content of from 35 wt % to 45 wt %.

Aspect 19. The method of any of Aspects 13 to 18, wherein the second thermoplastic polymer comprises polycarbonate (PC), polycarbonate-siloxane copolymer, polysiloxane, cyclic olefin copolymer (COC), polyetherimide (PEI), poly(phenylene oxide) (PPO), polyethylene terephthalate (PET), polymethyl methacrylate (PMMA), polyaryletherketone (PAEK), polyimide, polyolefin, polystyrene, copolymers thereof, or a combination thereof.

Aspect 20. The method of Aspect 19, wherein the second thermoplastic polymer comprises PMMA, copolymers thereof, polycarbonate-siloxane copolymer, COC, or a combination thereof.

Aspect 21. The method of any of Aspects 13 to 20, wherein the polymer film comprises:

from 0.5 wt % to 10 wt % of the polycarbonate copolymer comprising repeating siloxane units;

from 0.01 wt % to 2 wt % of the plurality of quantum dots; and from 89 wt % to 99.49 wt % of the second thermoplastic polymer.

Aspect 22. The method of any of Aspects 13 to 21, wherein the step of forming the polymer film from the mixture comprises one or more of extruding, injection molding, compression molding, transfer molding, thermoforming or additive manufacturing of the polymer film.

Aspect 23. A polymer film formed according to the method of any of Aspects 13 to 22.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

A QD solution acquired from Crystalplex Corp includes QDs with an alloy gradient change from CdSe to CdS with ZnS and $Al_2O_3$ passivation layers. The exterior surface is further functionalized with an alkyl functional group for good dispersion in solution. The QD solution was used as received without further treatment prior to fluorescence measurement.

The emission spectra were collected from a Fluorolog® 3 system, equipped with a double grating excitation monochromator, a double grating emission monochromator and a R928 photomultiplier tube detector. The samples were excited at 450 nm with a continuous wave 400 Watts Xenon light source, and their emission spectra were collected in the range from 460 nm to 600 nm.

Figure 1:
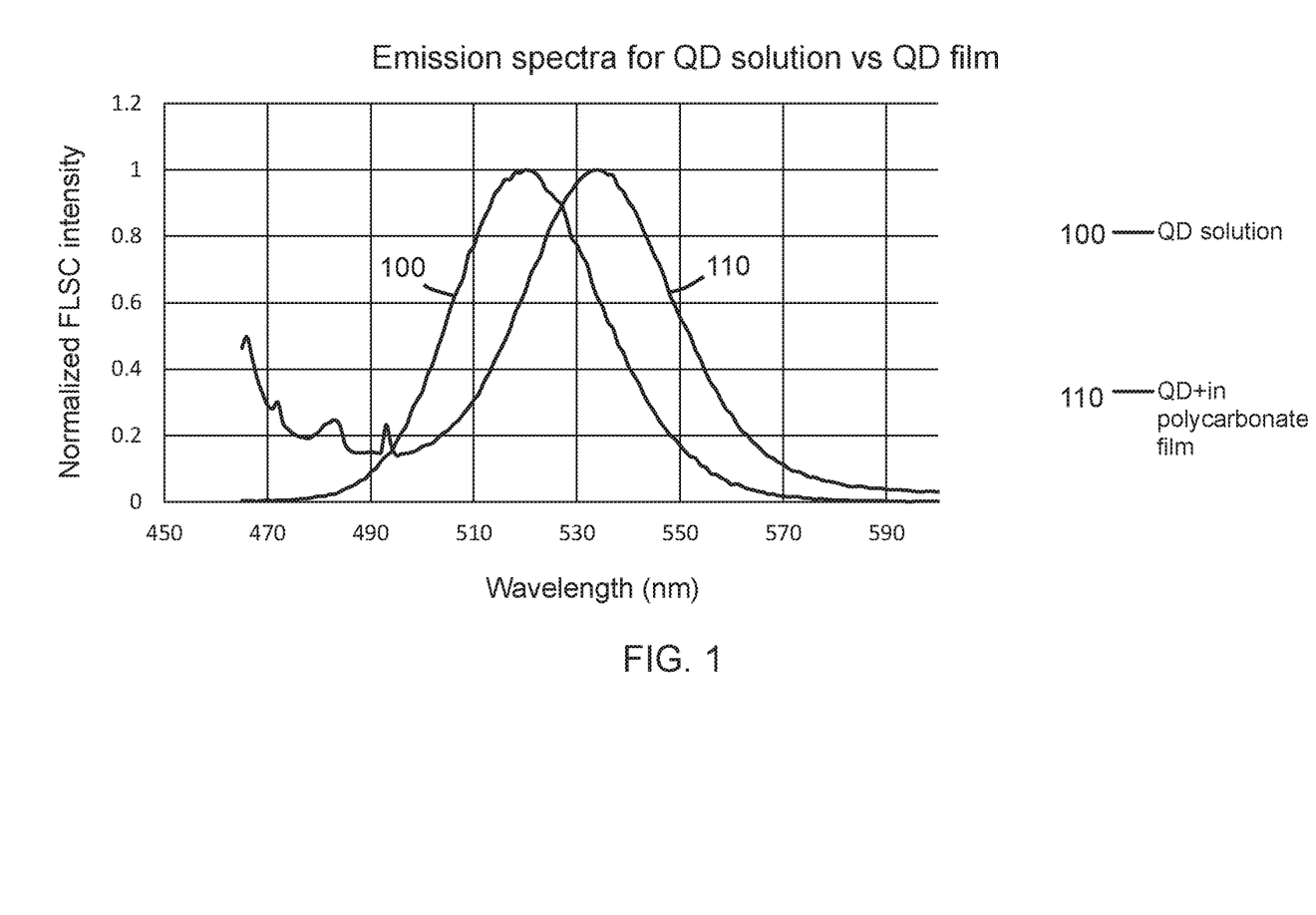
FIG. 1 is a graph showing the shift in emission peaks of emission spectra for quantum dots in solution as compared to quantum dots in a conventional thermoplastic film.

The peak wavelength of emission spectra of quantum dots are sensitive to agglomeration of QDs and/or environmental change of QDs. As an example, FIG. 1 shows the emission spectra of the same QDs collected in solution phase 100 and cast polycarbonate solid film 110. The peak wavelength of the emission spectra is red-shifted by 14 nm, from 521 nanometers (nm) in solution (100) to 535 nm in film (110). The full width at half maximum (FWHM) increased slightly by <1 nm. The redshift of peak wavelength and broadening of emission spectra have been well studied in the literature and are ascribed to multiple factors, including the environmental change of QDs (interaction of film and QDs) and also increased excitonic interactions of QDs (among QDs).

QDs are well separated in solution phase where excitonic interactions between QDs are negligible. In the solid state films, first, the effective dielectric medium around QDs changed, leading to the spontaneous decay rate and energy level of the transition dipole. The faster decays rate (shortened radiative lifetime) is associated to the quantum yield reduction. The reduced energy level of the transition dipole leads to the red shift of the emission. Second, the interparticle distance in the solid film is much closer than that in the solution phase, which results in a more complex excitonic properties. The homo-FRET that the energy is transferred from the smaller QDs to the larger ones in the ensemble results in a red shift phenomenon. Furthermore, increased exciton transfer and more excitons are trapped in defect sites at the surface of QDs, increasing the overall nonradiative recombination and the reduction of quantum yield. Therefore, the peak wavelength (PWL) of emission spectra are closely monitored to evaluate confluence of aforementioned factors.

Figure 3:
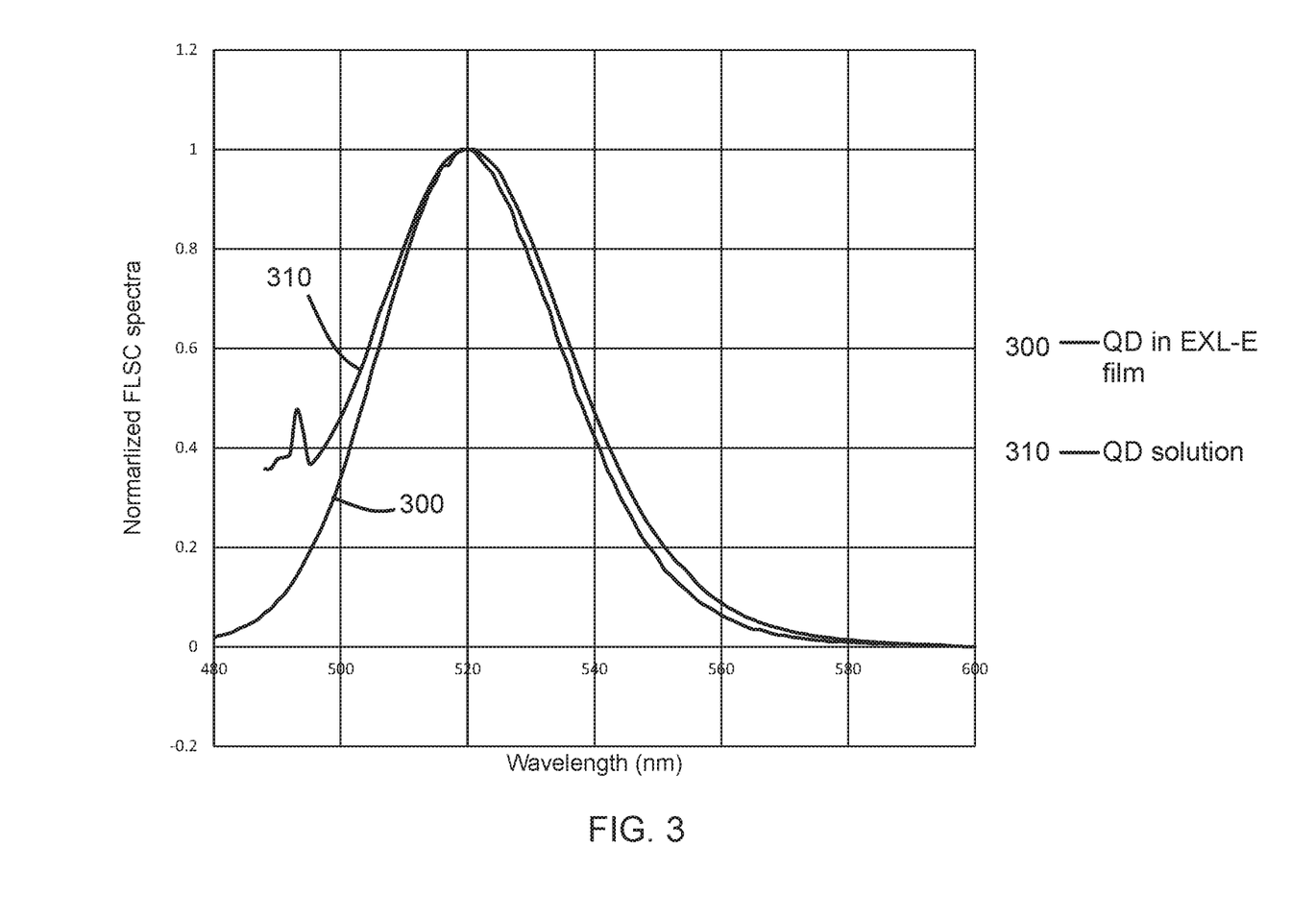
FIG. 3 is a graph comparing emission spectra of a quantum dot solution to a quantum dot film including a poly(carbonate-siloxane) copolymer according to aspects of the disclosure.

The effect of the poly(carbonate-siloxane) copolymer on QD dispersion in a film was evaluated. The copolymer building block shown in FIG. 2 was used, and is a poly(carbonate-siloxane) copolymer having a siloxane content of 40 wt %. The poly(carbonate-siloxane) copolymer is available from SABIC. FIG. 3 shows that dispersion of QDs in the PC-siloxane copolymer film (300) is largely preserved compared with the QDs in solution (310). Without being bound to any theory, it is thought that the siloxane domains of the poly(carbonate-siloxane) block copolymers may have a preferable adherence to the QDs, which helps to keep them separate during the film formation process and maintains good dispersion in the final QD film.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method of making a polymer film, comprising:
   forming a masterbatch composition by combining (1) a first thermoplastic copolymer comprising a polycarbonate copolymer comprising repeating siloxane units and (2) a plurality of quantum dots;
   combining the masterbatch composition with a second thermoplastic polymer to form a mixture; and
   forming the polymer film from the mixture,
   wherein the polycarbonate copolymer has a siloxane content of from 30 wt % to 50 wt %.

2. The method of claim 1, wherein the masterbatch composition comprises from 90 wt % to 99.9 wt % of the first thermoplastic copolymer and from 0.1 wt % to 10 wt % of the plurality of quantum dots.

3. The method of claim 1, wherein:
   the plurality of quantum dots are concentration-gradient quantum dots;
   the plurality of quantum dots comprise a passivation layer; or
   the plurality of quantum dots comprise surface ligands.

4. The method of claim 1, wherein the polycarbonate copolymer has a siloxane content of from 35 wt % to 45 wt %.

5. The method of claim 1, wherein the second thermoplastic polymer comprises polycarbonate (PC), polycarbonate-siloxane copolymer, polysiloxane, cyclic olefin copolymer (COC), polyetherimide (PEI), poly(phenylene oxide) (PPO), polyethylene terephthalate (PET), polymethyl methacrylate (PMMA), polyaryletherketone (PAEK), polyimide, polyolefin, polystyrene, copolymers thereof, or a combination thereof.

6. The method of claim 1, wherein the polymer film comprises:
   from 0.5 wt % to 10 wt % of the polycarbonate copolymer comprising repeating siloxane units;
   from 0.01 wt % to 2 wt % of the plurality of quantum dots; and
   from 89 wt % to 99.49 wt % of the second thermoplastic polymer.

7. The method according to claim 1, wherein the polycarbonate copolymer has a weight average molecular weight of 35,000 to 40,000 Da as measured by gel permeation chromatography using a crosslinked styrene-divinyl benzene column, at a sample concentration of 1 milligram per milliliter, and as calibrated with bisphenol A polycarbonate standards.

* * * * *